United States Patent
Yokota (10) Patent No.: US 7,580,679 B2
(45) Date of Patent: Aug. 25, 2009

(54) COMMUNICATION APPARATUS CHANGING MEASURING METHODS OF COMMUNICATION QUALITY

(75) Inventor: Tomoyoshi Yokota, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 316 days.

(21) Appl. No.: 10/974,401

(22) Filed: Oct. 27, 2004

(65) Prior Publication Data
US 2005/0101256 A1 May 12, 2005

(30) Foreign Application Priority Data
Oct. 29, 2003 (JP) .................... P.2003-369162

(51) Int. Cl.
*H04B 17/00* (2006.01)
(52) U.S. Cl. ............... 455/67.11; 455/456.5; 455/73; 455/90.3
(58) Field of Classification Search .............. 455/552.1, 455/553.1, 550.1, 403, 407, 500, 526, 73, 455/90.3, 456.5, 67.11
See application file for complete search history.

(56) References Cited

U.S. PATENT DOCUMENTS

| 6,363,260 | B1 | 3/2002 | Achour et al. | |
|---|---|---|---|---|
| 2001/0036150 | A1* | 11/2001 | Padovani | 370/206 |
| 2002/0027690 | A1* | 3/2002 | Bartur et al. | 359/152 |
| 2002/0142721 | A1* | 10/2002 | Souissi et al. | 455/41 |
| 2003/0008691 | A1* | 1/2003 | Chen et al. | 455/574 |
| 2003/0125010 | A1* | 7/2003 | Jung | 455/404 |
| 2004/0037222 | A1* | 2/2004 | Kim et al. | 370/229 |
| 2005/0020321 | A1* | 1/2005 | Rotzoll | 455/572 |

FOREIGN PATENT DOCUMENTS

| JP | 07107538 A | 4/1995 |
|---|---|---|
| JP | 2002-300644 | 10/2002 |
| JP | 2003503988 T | 1/2003 |

OTHER PUBLICATIONS

Japanese language office action and its English language translation for corresponding Japanese application 2003369162 lists the references above.

* cited by examiner

*Primary Examiner*—Tuan A Pham
(74) *Attorney, Agent, or Firm*—Hogan & Hartson LLP (57) ABSTRACT

A mode determination section receives control signals from a quality IF section, a quality IF section, and a quality IF section, and determines whether a W-LAN communication section, a personal handy phone communication section, and an EV-DO communication section are each during communication or in the sleep mode based on the control signals. A request section requests the quality IF section, the quality IF section, and the quality IF section to output the radio quality information at predetermined intervals. A quality determination section receives control signals from the quality IF section, the quality IF section, and the quality IF section. Then, it determines one of the W-LAN communication section, the personal handy phone communication section, and the EV-DO communication section to be used for communication based on the radio quality information indicated by the control signals.

6 Claims, 5 Drawing Sheets

COMMUNICATION APPARATUS CHANGING MEASURING METHODS OF COMMUNICATION QUALITY

BACKGROUND OF THE INVENTION

1. Field of the Invention

The invention relates to a communication apparatus, particularly to a communication apparatus which changes the measuring method of the communication quality according to the communication conditions.

2. Description of the Related Art

Recently, cdma2000 1x EV-DO (hereinafter referred to as "EV-DO") has been developed as a next-generation high-rate radio communication system. The EV-DO is a version of specializing cdma2000 1x provided by expanding cdma2000 to the third-generation system for data communications and increasing the transmission rate. "EV" means Evolution, and "DO" means Data Optimized.

The EV-DO system is approximately the same as the cdma2000 1x system in the configuration of a radio interface of a reverse channel from a radio communication terminal to a base station. As for the configuration of the radio interface of a forward channel from a base station to a radio communication terminal, whereas the bandwidth of 1.23 MHz is the same with that of the cdma2000 1x system, the modulation method and the multiplexing method are much different from those of the cdma2000 1x system. As for the modulation method, whereas QPSK and HPSK are used in the cdma2000 1x system, QPSK, 8-PSK, or 16QAM is selectively used in the EV-DO system according to a reception state of a forward channel of a radio communication terminal. As a result, a high transmission rate with low error resistance is used when the reception state is good, and a low transmission rate with high error resistance is used when the reception state is bad.

As for the multiplexing method for enabling multiple communications from one base station to a plurality of radio communication terminals, TDMA (Time Division Multiple Access) is employed in which communications with a plurality of radio communication terminals are performed in such a manner that time is divided in units of 1/600 second, a communication is performed with one radio communication terminal in each unit time, and the radio communication terminal to be communicated is switched every unit time, rather than CDMA (Code Division Multiple Access) which is employed in the cdmaOne system and the cdma2000 1x system.

A radio communication terminal measures a carrier-to-interference power ratio (hereinafter abbreviated as CIR) of a pilot signal as an index of a reception state of a forward channel from a base station to be communicated, predicts a reception state during the next reception time slot on the basis of a variation of the CIR, and notify "a maximum transmission rate which enables to receive with a error ratio that is lower than a predetermined rate", which is expected from the predicted reception state to the base station as data rate control bits (hereinafter referred to as DRC) predetermined. The predetermined error rate is usually set to about 1% though it depends on the system design. The base station receives the DRCs from a plurality of radio communication terminals, and a scheduler function in the base station determines with which radio communication terminal is to communicate in each division unit time. Basically, as high a transmission rate as possible is decided on the basis of a DRC sent from each radio communication terminal and is used for a communication with it.

With the above configuration, the EV-DO system enables a maximum transmission rate of 2.4 Mbps (mega-bits per second) per sector in a forward channel. This transmission rate is the sum of amounts of data communications from one base station to a plurality of radio communication terminals in one frequency band and in one of a plurality of sectors (usually, a plurality of sectors exist). The transmission rate increases if a plurality of frequency bands are used.

JP-A-2002-300644 is referred to as a related art.

In the case of including a plurality of mobile communication paths as the EV-DO system, the convenience for users is enhanced if it is possible to seamlessly switch among a plurality of the mobile communication paths, and for a user to perform communication through any of the mobile communication paths. In order to implement the switching, each radio quality information of the plurality of mobile communication paths are generally monitored by sampling at regular intervals. In the mobile communication path during data communication, various radio information are capable of being sampled at regular intervals. On the other hand, in the mobile communication path not being selected as the communication path, or even being selected but having no data to be communicated, the mobile communication terminal may be in the sleep mode for the purpose of battery saving. Therefore, the radio quality of the mobile communication path should be monitored by a different method from that in data communication. In the sleep mode, the RF circuit is operated for a short period in a given cycle, for example, for 100 ms (millisecond), once per 5 seconds, the mobile communication terminal carries out the tracking of a base station and the check of the incoming data.

In such a case, generally, the mobile communication terminal does not distinctly detect that it has shifted to the sleep mode. Therefore, since the acquired radio quality information is not classified as those in communication or those in the sleep mode, the reliability of the acquired radio quality information is not insured. As a countermeasure thereagainst, an echo back command is issued even when there has been no data to be communicated in order to prevent the mobile communication terminal from shifting to the sleep mode. However, unless the mobile communication terminal shifts to the sleep mode, the consumption of the battery is increased.

SUMMARY OF THE INVENTION

The object of the invention is to provide a communication apparatus which acquires the radio quality information of the communication apparatus corresponding to in communication and in the sleep mode.

The invention provides a communication apparatus having: a radio section that performs radio communication with a base station; a request section that requests quality information regarding the radio communication with the base station from the radio section; and a determination section that determines whether or not the radio section is in sleep mode based on a response from the radio section in response to the request.

The "response" includes the information directly included in the response, and the time from transmitting until reception of the response. They may be direct or indirect so long as they are the information capable of providing the response.

Thus, since the state of the radio section is determined according to the response with respect to the request, the determination of the sleep mode becomes precise.

The determination section may determine whether or not the radio section is in the sleep mode based on a timing of receiving the response. The communication apparatus further has a communication quality determination section that determines quality regarding the radio communication with the base station by processing a plurality of responses from the radio section in response to a plurality of requests from the request section, wherein when the determination section determines that the radio section is in the sleep mode, the communication quality determination section may process a predetermined number of the responses out of the plurality of the responses. When the determination section determines that the radio section is in the sleep mode, the communication quality determination section may process a response whose value is within a predetermined range out of the plurality of the responses. When the determination section determines that the radio section is in the sleep mode, the request section may request another quality information different from the quality information regarding the radio communication with the base station. When the determination section determines that the radio section is in the sleep mode, the communication quality determination section may process a plurality of responses from the radio section in response to the request for the another quality information.

Another communication apparatus has a communication section that communicates with a base station, an operation mode control section that selects any of the continuous operation mode of continuously operating the communication section and the intermittent operation mode of intermittently operating the communication section to instruct the communication section to operate in the selected operation mode, and a quality acquisition section that acquires a value of transmission path quality measured at the communication section. In the communication apparatus, when the acquired value of the transmission path quality is meaningless, the quality acquisition section processes it as a value corresponding to an error in the continuous operation mode of the communication section, while the quality acquisition section excludes the meaningless value of the transmission path quality from the candidates for processing in the intermittent operation mode of the communication section.

The communication section may change the statistics processing method of the value of the transmission path quality according to the instructed operation mode. The communication apparatus further has a storage section that stores the acquired value of the transmission path quality. When the acquired value of the transmission path quality is meaningless, the quality acquisition section stores the value corresponding to an error in the storage section in the continuous operation mode of the communication section, while the quality acquisition section may not store the meaningless value of the transmission path quality in the storage section in the intermittent operation mode of the communication section.

Another communication apparatus has a plurality of communication section that respectively communicates with a plurality of base stations, an operation mode control section that respectively selects any of the continuous operation mode of continuously operating the communication section and the intermittent operation mode of intermittently operating the communication section for the plurality of the communication section to instruct the plurality of the communication sections to operate in their respective selected operation modes, a quality acquisition section that respectively acquires a plurality of values of the transmission path quality measured at the plurality of the communication sections, and a decision section that compares the plurality of the acquired values of the transmission path quality to decide one of the plurality of the communication section to be used for data communication. In the communication apparatus, when the acquired value of the transmission path quality is meaningless, the quality acquisition section processes it as a value corresponding to an error in the continuous operation mode of the communication section, while the quality acquisition section excludes the meaningless value of the transmission path quality from the candidates for processing in the intermittent operation mode of the communication section.

The plurality of the communication sections may respectively change the statistics processing method of the value of the transmission path quality according to the instructed operation mode. Each of the communication apparatus further has a storage section that respectively stores a plurality of the acquired values of the transmission path quality. When the acquired values of the transmission path quality are meaningless, the quality acquisition section stores the value corresponding to an error in the storage section in the continuous operation mode of the communication section, while the quality acquisition section may not store the meaningless value of the transmission path quality in the storage section in the intermittent operation mode of the communication section. The decision section may compare a plurality of the stored transmission path quality values.

Any given combinations of the foregoing constituent elements, the ones obtained by converting the expression of the invention among the methods, devices, systems, recording media, computer programs, and the like are also effective as the embodiments of the invention.

Consequently, it is possible to acquire the radio quality information of the communication apparatus corresponding to in communication and in the sleep mode.

DETAILED DESCRIPTION OF THE PREFERRED EMBODIMENTS

An embodiment of the invention relate to a communication apparatus which enables to communicate under the W-LAN, the EV-DO system, or the personal handyphone system, and selects one of them while switching among them. The following description will be given for the EV-DO system having an intermediately ranked maximum transmission rate and the largest difference in the communication system between the reverse channel and the forward channel out of the three radio communication systems. In the embodiment, the communication apparatus regularly acquires the radio quality information as the criteria for switching among the three radio communication systems. Since communications under the two communication systems is not being carried out, the communication sections corresponding those systems may be in the sleep mode.

The communication apparatus of the embodiment detects that the communication section is in the sleep mode based on the response to the request for the communication section. Further, the communication apparatus has a buffer for storing the radio quality information to be acquired during communication, and further another buffer for storing the radio quality information to be acquired during the sleep mode. These buffers are distinctively used according to the operation of the communication section. The radio quality information to be acquired during the sleep mode may be not equal to the radio quality information to be acquired during communication. The radio quality information during communication is generated by statistically processing sampled values acquired for a relatively long period, for example, from 10 ms to 50 ms. On the other hand, in the sleep mode, an instantaneous sampled value is taken as the radio quality information. In the sleep mode, the period during which the radio quality information can be sampled after the operation of the communication section and the completion of the initialization of a RF circuit is short. Accordingly, the sampled value is taken as radio quality information as it is without being statistically processed, so that the reliability of the radio quality information enhances.

Figure 1:
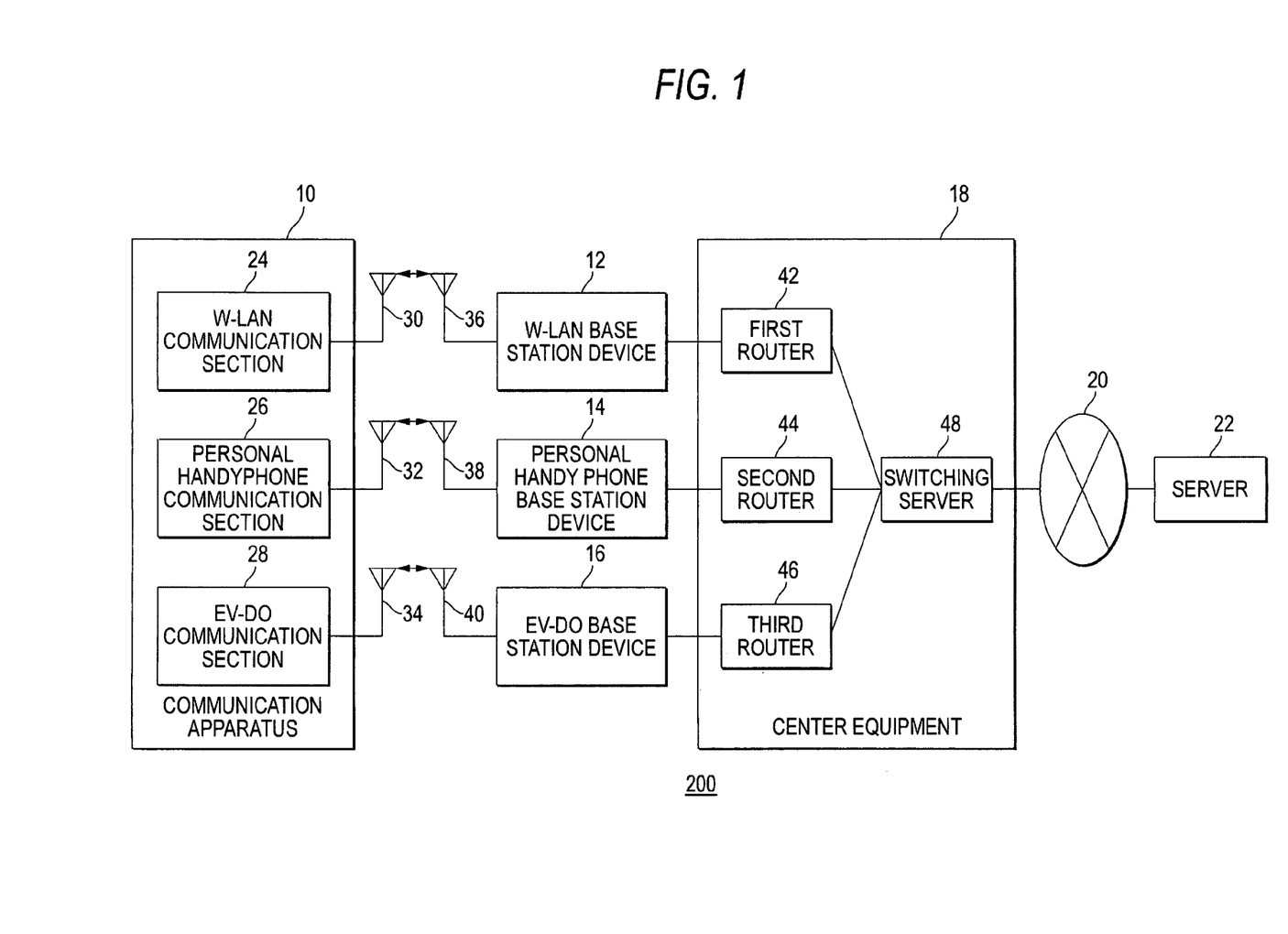
FIG. 1 is a block view showing a communication system of an embodiment.

FIG. 1 shows a communication system 200 of the embodiment. The communication system 200 includes a communication apparatus 10, a W-LAN base station 12, a personal handy phone base station 14, an EV-DO base station 16, a center equipment 18, a network 20, and a server 22. The communication apparatus 10 includes a W-LAN communication section 24, a W-LAN antenna 30, a personal handy phone communication section 26, a personal handy phone antenna 32, an EV-DO communication section 28, and an EV-DO antenna 34. The W-LAN base station 12 includes a W-LAN base station antenna 36. The personal handy phone base station 14 includes a personal handy phone base station antenna 38. The EV-DO base station 16 includes an EV-DO base station antenna 40. The center equipment 18 includes a first router 42, a second router 44, a third router 46, and a switching server 48.

The communication apparatus 10 is a mobile terminal having a communication function. The communication apparatus 10 includes, as a plurality of communication means, the W-LAN communication section 24, the personal handy phone communication section 26, and the EV-DO communication section 28. The communication apparatus 10 does not perform communication simultaneously with the W-LAN communication section 24, the personal handy phone communication section 26, and the EV-DO communication section 28. The communication apparatus 10 monitors qualities of each communication section to autonomously select the optimum one for communication. The communication apparatus 10 may be configured as one device. Alternatively, the communication apparatus 10 may be configured by inserting a communication card having the respective functions of the W-LAN communication section 24, the personal handy phone communication section 26, and the EV-DO communication section 28 into a PC. In the latter case, the selection of the communication means is executed by the software program installed in the PC. The W-LAN communication section 24, the personal handy phone communication section 26, and the EV-DO communication section 28 have the W-LAN antenna 30, the personal handy phone antenna 32, and the EV-DO antenna 34, respectively.

The W-LAN base station 12 is in conformity with the W-LAN communication system, and communicates with the W-LAN communication section 24 through the W-LAN base station antenna 36. The personal handy phone base station 14 is in conformity with the personal handy phone system, and communicates with the personal handy phone communication section 26 through the personal handy phone base station antenna 38. The EV-DO base station 16 is in conformity with the EV-DO system, and communicates with the EV-DO communication section 28 through the EV-DO base station antenna 40.

The switching server 48 has a function of switching among the W-LAN base station 12, the personal handy phone base station 14, and the EV-DO base station 16 according to the selection of the communication sections by the communication apparatus 10. According to the selection by the switching server 48, any of the first router 42, the second router 44, and the third router 46 carries out routing based on the IP addresses respectively allocated to the W-LAN base station 12, the personal handy phone base station 14, and the EV-DO base station 16. For between the switching server 48, and the W-LAN communication section 24, the personal handy phone communication section 26, and the EV-DO communication section 28, if required, the processing by the IP sec (IP security protocol) or the like may be performed to enhance the security. The switching server 48 connects with the server 22 through the network 20.

Figure 2:
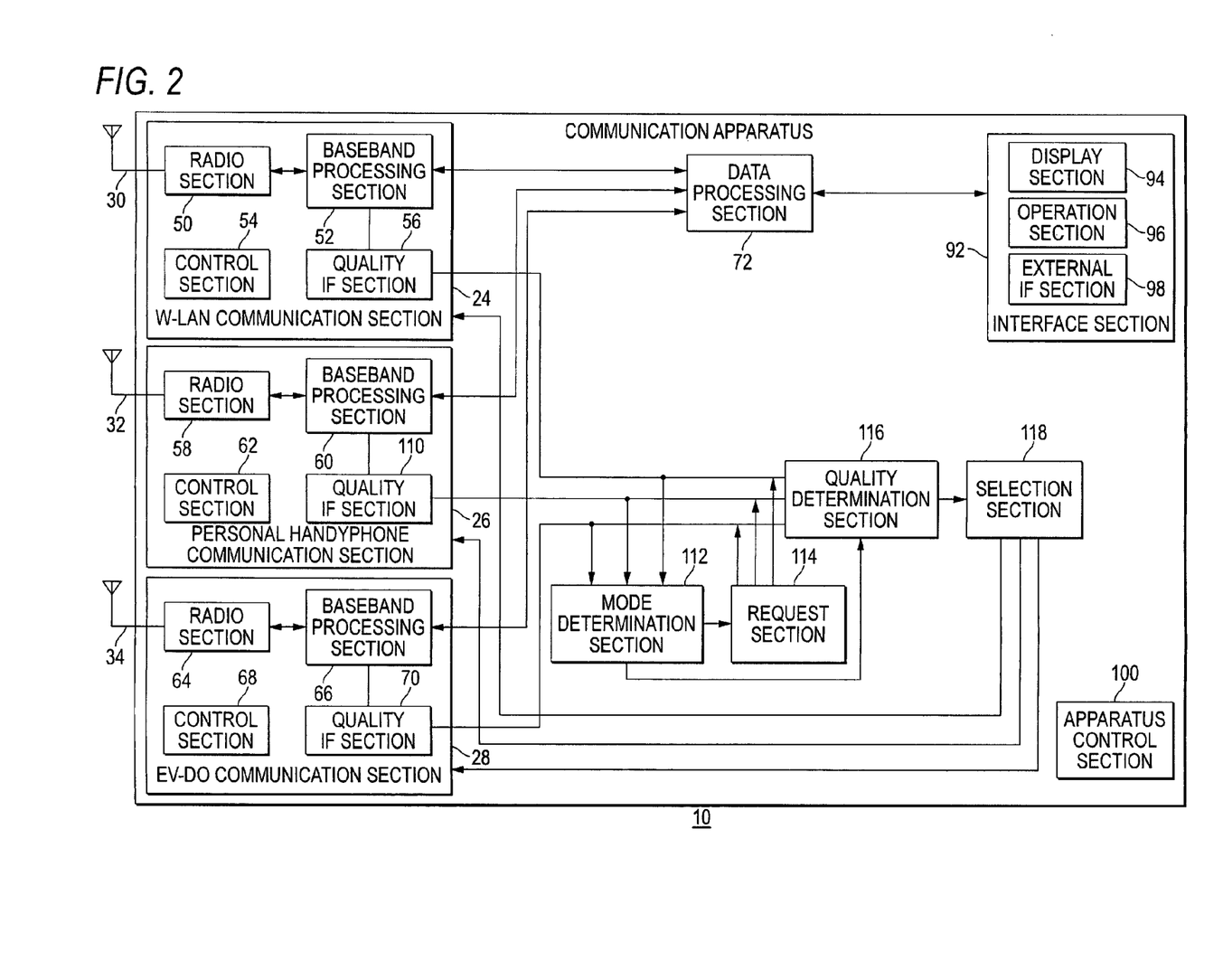
FIG. 2 is a view showing a configuration of a communication apparatus of FIG. 1.

FIG. 2 shows a configuration of the communication apparatus 10. The communication apparatus 10 includes the W-LAN communication section 24, the personal handy phone communication section 26, the EV-DO communication section 28, a data processing section 72, an interface section 92, an apparatus control section 100, a mode determination section 112, a request section 114, a quality determination section 116, and a selection section 118. The W-LAN communication section 24 includes a radio section 50, a baseband processing section 52, a control section 54, and a quality IF section 56. The personal handy phone communication section 26 includes a radio section 58, a baseband processing section 60, a control section 62, and a quality IF section 110. The EV-DO communication section 28 includes a radio section 64, a baseband processing section 66, a control section 68, and a quality IF section 70. The interface section 92 includes a display section 94, an operation section 96, and an external IF section 98.

The radio section 50 has a frequency converting function of converting a radio frequency signal and a baseband signal of the W-LAN, an amplifying function of amplifying a signal, and a function of performing AD conversion or DA conversion.

The baseband processing section 52 performs modulation and demodulation processing of the baseband signal. When the W-LAN is in conformity with IEEE 802.11b, the baseband processing section 52 has a spreading processing function and a despreading processing function. When the W-LAN is in conformity with IEEE 802.11a or IEEE 802.11g, the baseband processing section 52 has a fast Fourier transformation function or an inverse fast Fourier transformation function.

The quality IF section 56 outputs a predetermined control signal processed at the W-LAN communication section 24 as radio quality information. The control section 54 performs timing control of the W-LAN communication section 24 and the generation of a control signal.

The radio section 58, the baseband processing section 60, the control section 62, and the quality IF section 110 perform the processings corresponding to the radio section 50, the baseband processing section 52, the control section 54, and the quality IF section 56 on the personal handy phone system. For example, the baseband processing section 60 performs modulation and demodulation at π/4 shift QPSK.

The radio section 64, the baseband processing section 66, the quality IF section 70, and the control section 68 perform the processings corresponding to the radio section 50, the baseband processing section 52, the quality IF section 56, and the control section 54 on the EV-DO system. For example, the baseband processing section 66 performs the processings based on CDMA for the reverse channel, and TDMA for the forward channel.

The data processing section 72 converts data between any of the baseband processing section 52, the baseband processing section 60, and the baseband processing section 66, and the interface section 92.

The display section 94 corresponds to a display for displaying a predetermined data. The operation section 96 corresponds to a keyboard for a user to input a predetermined processing, or the like. The external IF section 98 is an interface for inputting and outputting data with an external device.

The mode determination section 112 receives control signals from the quality IF section 56, the quality IF section 110, and the quality IF section 70. The mode determination section 112 then determines whether the W-LAN communication section 24, the personal handy phone communication section 26, and the EV-DO communication section 28 are each in communication or in the sleep mode based on the control signals. Unless a control signal is inputted from the quality IF section 70 to the mode determination section 112 until a predetermined time when a request section 114 described later requests the radio quality information from the quality IF section 70, the mode determination section 112 determines the EV-DO communication section 28 to be in the sleep mode. It operates in the same manner as for the W-LAN communication section 24 and the personal handy phone communication section 26.

The request section 114 requests the quality IF section 56, the quality IF section 110, and the quality IF section 70 to output the radio quality information at predetermined intervals. The predetermined intervals may be different among the quality IF section 56, the quality IF section 110, and the quality IF section 70, and may also be different between in communication and in the sleep mode. In this case, the information regarding whether the W-LAN communication section 24, the personal handy phone communication section 26, and the EV-DO communication section 28 are respectively in communication or in the sleep mode is inputted from the mode determination section 112.

The quality determination section 116 receives control signals from the quality IF section 56, the quality IF section 110, and the quality IF section 70. The quality determination section 116 then determines one of the W-LAN communication section 24, the personal handy phone communication section 26, and the EV-DO communication section 28 to be used for communication based on the radio quality information indicated by the control signals. For example, when the radio quality information at the quality IF section 56, the quality IF section 110, and the quality IF section 70 are the received powers, threshold values are determined for the respective information. Thus, the one whose the difference between each received power from the quality IF section 56 is the largest, the quality IF section 110, and the quality IF section 70 and its corresponding threshold value is selected. One of the selected W-LAN communication section 24, personal handy phone communication section 26, and EV-DO communication section 28 is outputted to the selection section 118. The quality determination section 116 has a buffer for during communication and a buffer for the sleep mode in its inside, and stores the corresponding data.

When the communication terminal 10 is in communication, the quality determination section 116 statistically processes the values of the radio quality information from the quality IF section 56, the quality IF section 110, and the quality IF section 70, and then performs the foregoing determination. In contrast, when the communication terminal 10 is in the sleep mode, the quality determination section 116 performs the forgoing determination with the instantaneous values or a value obtained by statistically processing the values of the radio quality information with smaller number than that for determination in communication. Namely, the quality determination section 116 changes the statistical processing method according to the operations of the W-LAN communication section 24, the personal handy phone communication section 26, and the EV-DO communication section 28. Alternatively, the quality determination section 116 may statistically process only the radio quality information whose value is within a predetermined range to determine in the sleep mode. Further, when the value of the acquired radio quality information is a meaningless value, the quality determination section 116 processes the value as a value corresponding to an error in communication, and excludes the value from the candidates for processing in the sleep mode.

The selection section 118 uses one of the W-LAN communication section 24, the personal handy phone communication section 26, and the EV-DO communication section 28 selected by the quality determination section 116, and does not use the rest or shifts those to the sleep mode.

The apparatus control section 100 performs timing control, generation of a control signal and so on.

In terms of the hardware, this configuration can be implemented by a CPU, a memory, or other LSIs of a given computer. In terms of the software, it can be implemented by a program with a reservation control function loaded in a memory, or the like. Herein, the functional blocks implemented by conjunction of these are shown. Therefore, the fact that these functional blocks can be implemented in various forms by only hardware, only software, or a combination thereof will be understood by those skilled in the art.

Figure 3:
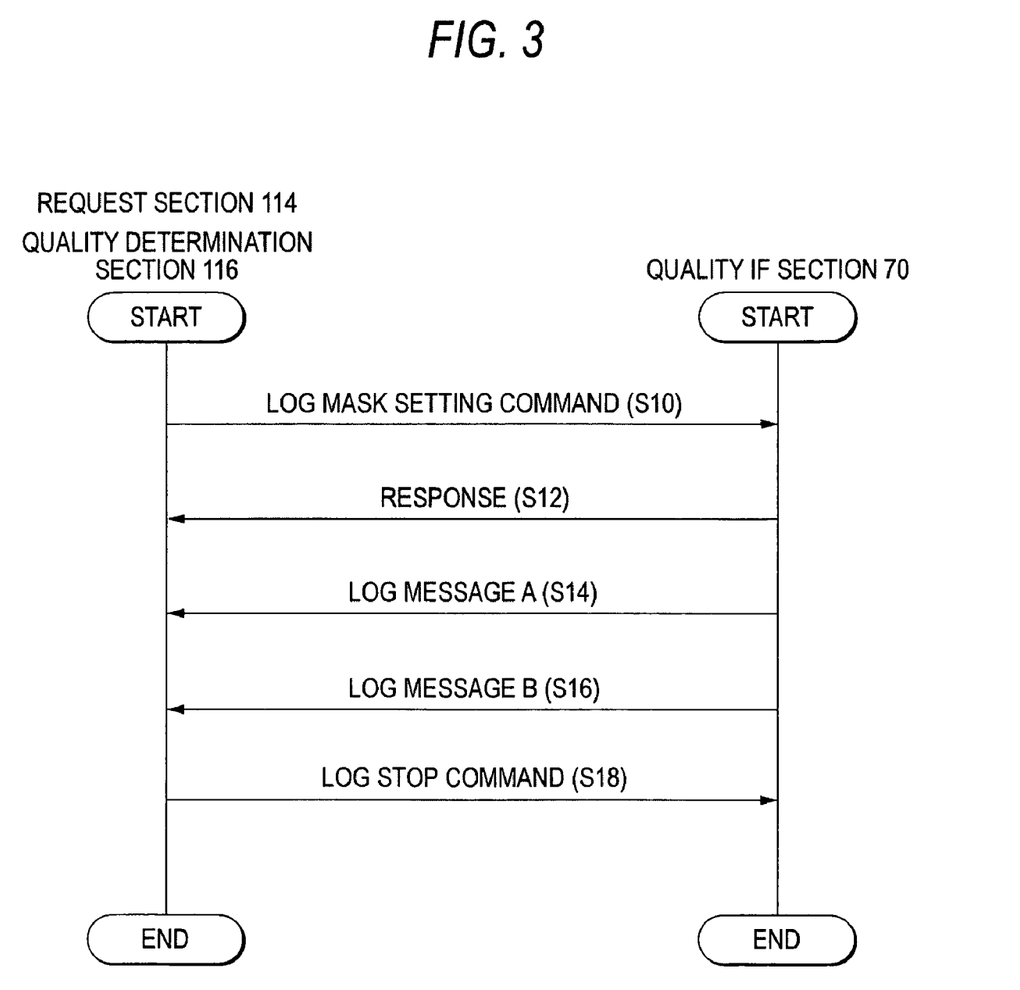
FIG. 3 is a sequence diagram showing quality information acquisition of FIG. 2.

FIG. 3 is a sequence diagram showing quality information acquisition. In FIG. 3, there is shown a case where radio quality information is acquired from the quality IF section 70 corresponding to the EV-DO system as a representative of the quality IF section 56, the quality IF section 110, and the quality IF section 70. The EV-DO communication section 28 is assumed to be in communication. The request section 114 outputs a log mask setting command to the quality IF section 70 in order to request the output of radio quality information therefrom (S10) The quality IF section 70 outputs a response with respect to the input of the log mask setting command to the quality determination section 116 (S12). Further, the quality IF section 70 outputs a log message A corresponding to the log mask setting command (S14) and then outputs a log message B (S16) to the quality determination section 116. For example, the log message A is a received power, and the log message B is a carrier power to interference power ratio. These values have been subjected to a statistics processing such as averaging in order to reduce the effects of a noise. The quality IF section 70 regularly outputs the log messages A and B. The request section 114 outputs a log stop command to the quality IF section 70 when the output of the radio quality information becomes unnecessary (S18).

Figure 4:
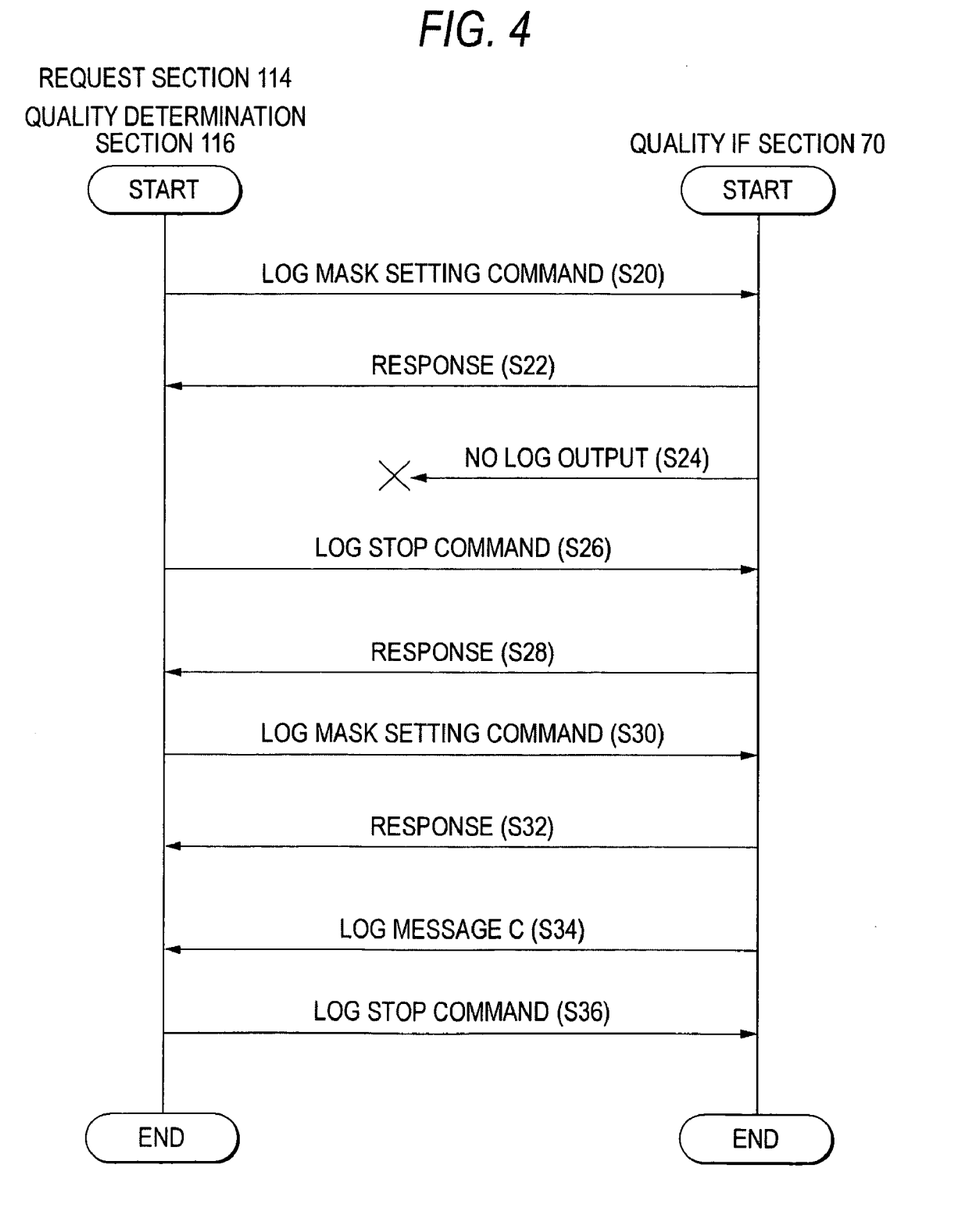
FIG. 4 is a sequence diagram showing quality information acquisition of FIG. 2.

FIG. 4 is a sequence diagram showing quality information acquisition. In FIG. 4 also, there is shown a case where the radio quality information is acquired from the quality IF section 70 corresponding to the EV-DO system as a representative of the quality IF section 56, the quality IF section 110, and the quality IF section 70. The EV-DO communication section 28 is assumed to be in the sleep mode. The request section 114 outputs a log mask setting command to the quality IF section 70 in order to request the output of the radio quality information therefrom (S20). The quality IF section 70 outputs a response with respect to the input of the log mask setting command to the quality determination section 116 (S22). However, when the quality IF section 70 does not output a log within a predetermined period (S24), the mode determination section 112 determines the EV-DO communication section 28 to be in the sleep mode.

The request section 114 outputs a log stop command to the quality IF section 70 in order to acquire the radio quality information corresponding to the sleep mode (S26). The quality IF section 70 outputs a response with respect to the input of the log stop command to the quality determination section 116 (S28). The request section 114 outputs a log mask setting command for requesting the radio quality information corresponding to the sleep mode (S30). The quality IF section 70 outputs a response with respect to the input of the log mask setting command to the quality determination section 116 (S32). Further, the quality IF section 70 outputs a log message C corresponding to log mask setting command to the quality determination section 116 (S34). For example, the log message C is a received power, but it is assumed to be an instantaneous value not subjected to a statistics processing as distinct from the log message of FIG. 3. The request section 114 outputs a log stop command to the quality IF section 70 (S36).

Figure 5:
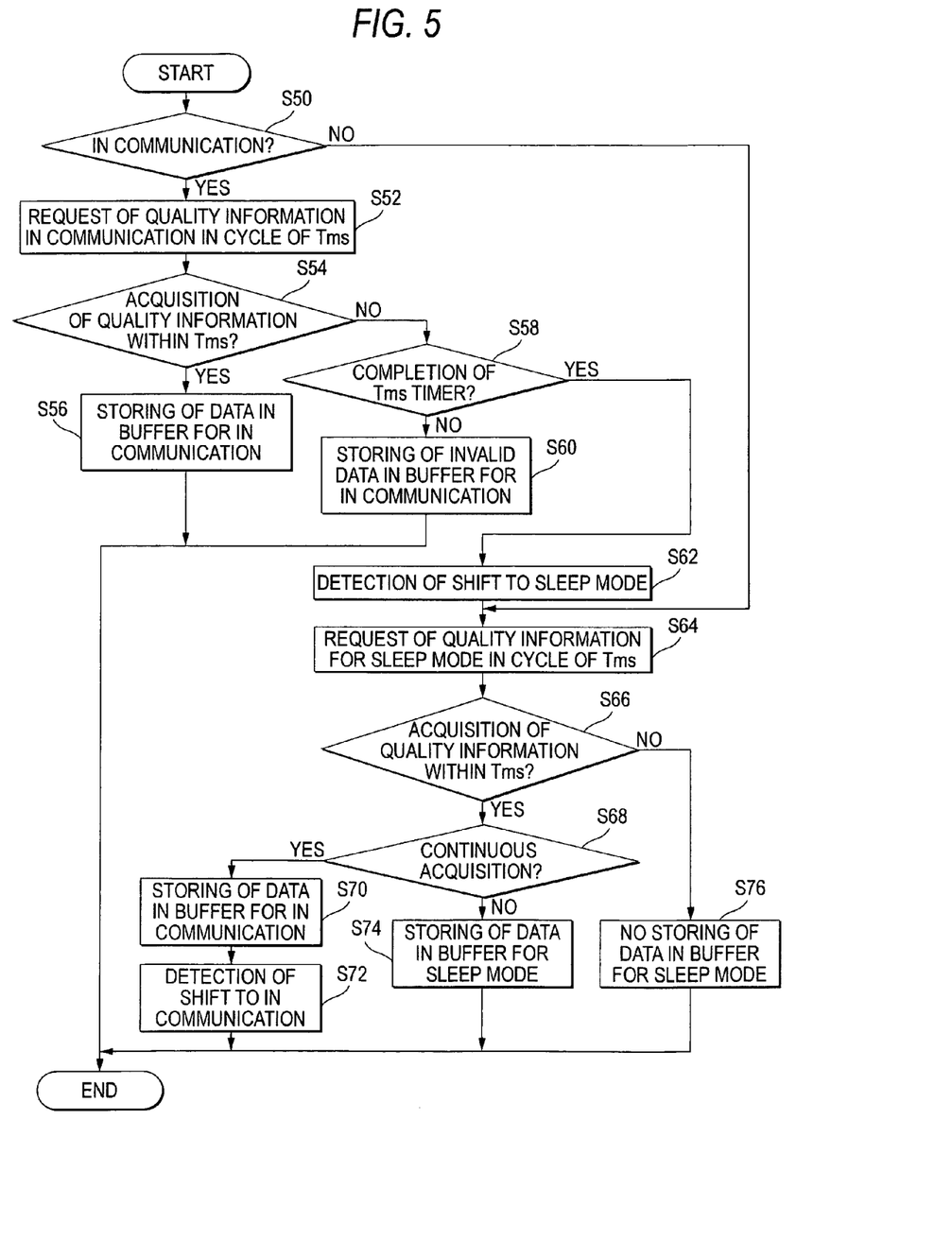
FIG. 5 is a flowchart showing an acquisition procedure of quality information of FIG. 2.

FIG. 5 is a flowchart showing the acquisition procedure of quality information. When the EV-DO communication section 28 is determined to be in communication by the mode determination section 112 (Y of S50), the request section 114 requests the radio quality information in communication in a cycle of Tms to the quality IF section 70 (S52). When the quality determination section 116 can acquire the radio quality information within Tms (Y of S54), the quality determination section 116 stores the data in a buffer for in communication (S56). On the other hand, when the quality determination section 116 cannot acquire the radio quality information within Tms (N of S54), and continuously a Tms timer is not completed (N of S58), the quality determination section 116 stores the data indicative of invalidness in a buffer for in communication (S60). When the Tms timer has been completed (Y of S58), the mode determination section 112 detects the shift to the sleep mode (S62).

In this case, including the case where the EV-DO communication section 28 has not been determined to be in communication by the mode determination section 112 (N of S50), the request section 114 requests the radio quality information for the sleep mode in a cycle of Tms from the quality IF section 70 (S64). Unless the quality determination section 116 can acquire the radio quality information within Tms (N of S66), the quality determination section 116 does not store the data in the buffer for the sleep mode (S76). On the other hand, when the quality determination section 116 can acquire the radio quality information within Tms (Y of S66), but cannot acquire it continuously (N of S68), it stores the data in the buffer for the sleep mode (S74). When continuous acquisition is possible (Y of S68), the data is stored in the buffer for communication (S70). Further, the mode determination section 112 detects the shift to communication (S72).

In accordance with the embodiment, it is possible to discriminate between in communication and in the sleep mode. Even in the sleep mode, it is possible to acquire high reliability radio quality information. It is possible to acquire the radio quality information each suitable for in communication and in the sleep mode.

Up to this point, the invention was described by way of the embodiments. It is to be understood by those skilled in the art, that the embodiments are illustrative, that various modified examples are possible regarding the combinations of the respective constituent elements and the respective processing processes, and that such modified examples also fall within the scope of the invention.

In the embodiment, the quality determination section 116 measures the received power as the radio quality information. However, not limited to this, for example, SINR (Signal to Interference and Noise Ratio), DRC (Data Rate Control) information, the transmit output, or DRC Lock information is also acceptable. In those examples, it is possible to acquire the suitable radio quality information according to the environment to which the communication apparatus 10 is applied. In other words, it is essential only that whether the communication apparatus 10 is in the environment suitable for communication or not.

In the embodiment, as the radio communication systems, the EV-DO system, the W-LAN, and the personal handy phone system are used. However, not limited to these, for example, the PDC (Personal Digital Cellular), and the W-CDMA (Wide-band CDMA) are also acceptable. In accordance with this modified example, the communication apparatus 10 is applicable to a large number of radio communication systems.

What is claimed is:

1. A communication apparatus comprising:
a radio section that performs radio communication with a base station;
a request section that requests to the radio section quality information regarding the radio communication with the base station; and
a determination section that determines whether or not the radio section is in sleep mode based on a response from the radio section in response to the request of the request section.

2. The communication apparatus according to claim 1, wherein the determination section determines whether or not the radio section is in the sleep mode based on a timing of receiving the response.

3. A communication apparatus comprising:
a radio section that performs radio communication with a base station;
a request section that requests quality information regarding the radio communication with the base station from the radio section; and
a determination section that determines whether or not the radio section is in sleep mode based on a response from the radio section in response to the request;
a communication quality determination section that determines quality regarding the radio communication with the base station by processing a plurality of responses from the radio section in response to a plurality of requests from the request section,
wherein when the determination section determines that the radio section is in the sleep mode, the communication quality determination section processes a predetermined number of the responses out of the plurality of the responses.

4. A communication apparatus comprising:
a radio section that performs radio communication with a base station;
a request section that requests quality information regarding the radio communication with the base station from the radio section; and
a determination section that determines whether or not the radio section is in sleep mode based on a response from the radio section in response to the request;
a communication quality determination section that determines quality regarding the radio communication with the base station by processing a plurality of responses from the radio section in response to a plurality of requests from the request section, wherein when the determination section determines that the radio section is in the sleep mode, the communication quality determination section processes a response whose value is within a predetermined range out of the plurality of the responses.

5. The communication apparatus according to claim 1, wherein when the determination section determines that the radio section is in the sleep mode, the request section requests another quality information different from the quality information regarding the radio communication with the base station.

6. The communication apparatus according to claim 5, further comprising:

a communication quality determination section that determines quality regarding the radio communication with the base station by processing a plurality of responses from the radio section in response to a plurality of requests from the request section, wherein when the determination section determines that the radio section is in the sleep mode, the communication quality determination section processes a plurality of responses from the radio section in response to the request for the another quality information.

* * * * *